US011556632B2

(12) United States Patent
Mima

(10) Patent No.: US 11,556,632 B2
(45) Date of Patent: Jan. 17, 2023

(54) INFORMATION PROCESSING APPARATUS AND METHOD OF CONTROLLING INFORMATION PROCESSING APPARATUS

(71) Applicant: CANON KABUSHIKI KAISHA, Tokyo (JP)

(72) Inventor: Tsuyoshi Mima, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/675,830

(22) Filed: Nov. 6, 2019

(65) Prior Publication Data
US 2020/0159910 A1    May 21, 2020

(30) Foreign Application Priority Data

Nov. 15, 2018    (JP) .............................. JP2018-214684

(51) Int. Cl.
*G06F 21/51*    (2013.01)
*G06F 12/14*    (2006.01)
*G06F 21/53*    (2013.01)

(52) U.S. Cl.
CPC .......... *G06F 21/51* (2013.01); *G06F 12/1408* (2013.01); *G06F 12/1491* (2013.01); *G06F 21/53* (2013.01)

(58) Field of Classification Search
CPC .. G06F 21/51; G06F 12/1408; G06F 12/1491; G06F 21/53
See application file for complete search history.

(56) References Cited

U.S. PATENT DOCUMENTS

| 6,539,474 | B2 * | 3/2003 | Matsuura ................... G06F 8/60 711/103 |
| 8,060,716 | B2 * | 11/2011 | Ito ........................... G06F 9/468 711/163 |
| 2003/0197886 | A1 * | 10/2003 | Fujinaga ............ G06K 15/1803 358/1.14 |

(Continued)

FOREIGN PATENT DOCUMENTS

| JP | 2004326307 A | 11/2004 |
| JP | 2008244992 A | 10/2008 |

(Continued)

OTHER PUBLICATIONS

Machine translation of Japanese patent application No. JP 2018061151 A, Miwa Kunihiro et al (Year: 2018).*

(Continued)

*Primary Examiner* — Shanto Abedin
(74) *Attorney, Agent, or Firm* — Canon U.S.A., Inc. IP Division

(57) ABSTRACT

In an information processing apparatus, a second central processing unit (CICU) uses an alteration detection program stored in a second memory to perform alteration detection on a program to be executed at a time of activation of a first CPU stored in a first memory. In a case where no alteration is detected in the program to be executed at the time of activation, the second CPU activates the first CPU using the program to be executed at the time of activation, and uses the activated first CPU to switch a program to be executed by the second CPU from the alteration detection program stored in the second memory to another processing program stored in the first memory.

9 Claims, 4 Drawing Sheets

(56) References Cited

U.S. PATENT DOCUMENTS

| | | | | |
|---|---|---|---|---|
| 2004/0107237 A1* | 6/2004 | Kashiwada | ............. | G06F 21/51 709/200 |
| 2006/0236150 A1* | 10/2006 | Lintz, Jr. | ............. | G06F 11/1417 714/6.13 |
| 2006/0277321 A1* | 12/2006 | Arsenault | ........... | H04L 63/1408 709/244 |
| 2008/0282345 A1* | 11/2008 | Beals | ...................... | G06F 21/51 726/21 |
| 2011/0035739 A1* | 2/2011 | Harada | ..................... | G06F 1/32 713/321 |
| 2011/0044451 A1* | 2/2011 | Anzai | ..................... | G06F 21/51 711/E12.001 |
| 2013/0042132 A1* | 2/2013 | Park | ...................... | G06F 1/3275 713/324 |
| 2015/0022838 A1* | 1/2015 | Takiguchi | ............. | G06F 3/1229 358/1.13 |
| 2015/0074387 A1* | 3/2015 | Lewis | .................. | G06F 21/575 713/2 |
| 2015/0153972 A1* | 6/2015 | Oba | ...................... | G06F 3/1229 358/1.14 |
| 2018/0081712 A1* | 3/2018 | Kanai | .................. | G06F 9/4812 |

FOREIGN PATENT DOCUMENTS

| | | | | |
|---|---|---|---|---|
| JP | 2012181882 A | | 9/2012 | |
| JP | 2014021953 A | | 2/2014 | |
| JP | 2016107570 A | | 6/2016 | |
| JP | 2019128792 | * | 8/2019 | .......... G06F 11/3604 |
| WO | 2009-013825 A1 | | 1/2009 | |

OTHER PUBLICATIONS

Machine translation of Japanese patent application No. JP 2019128792 A, Umimura Shizuka (Year: 2019).*

Machine translation of Japanese patent application No. JP 2020071723 A. Nomura Shigehisa (Year: 2020).*

Machine translation of Japanese patent application No. JP 2014151720 A, Ichihara Masaaki et al (Year: 2014).*

* cited by examiner

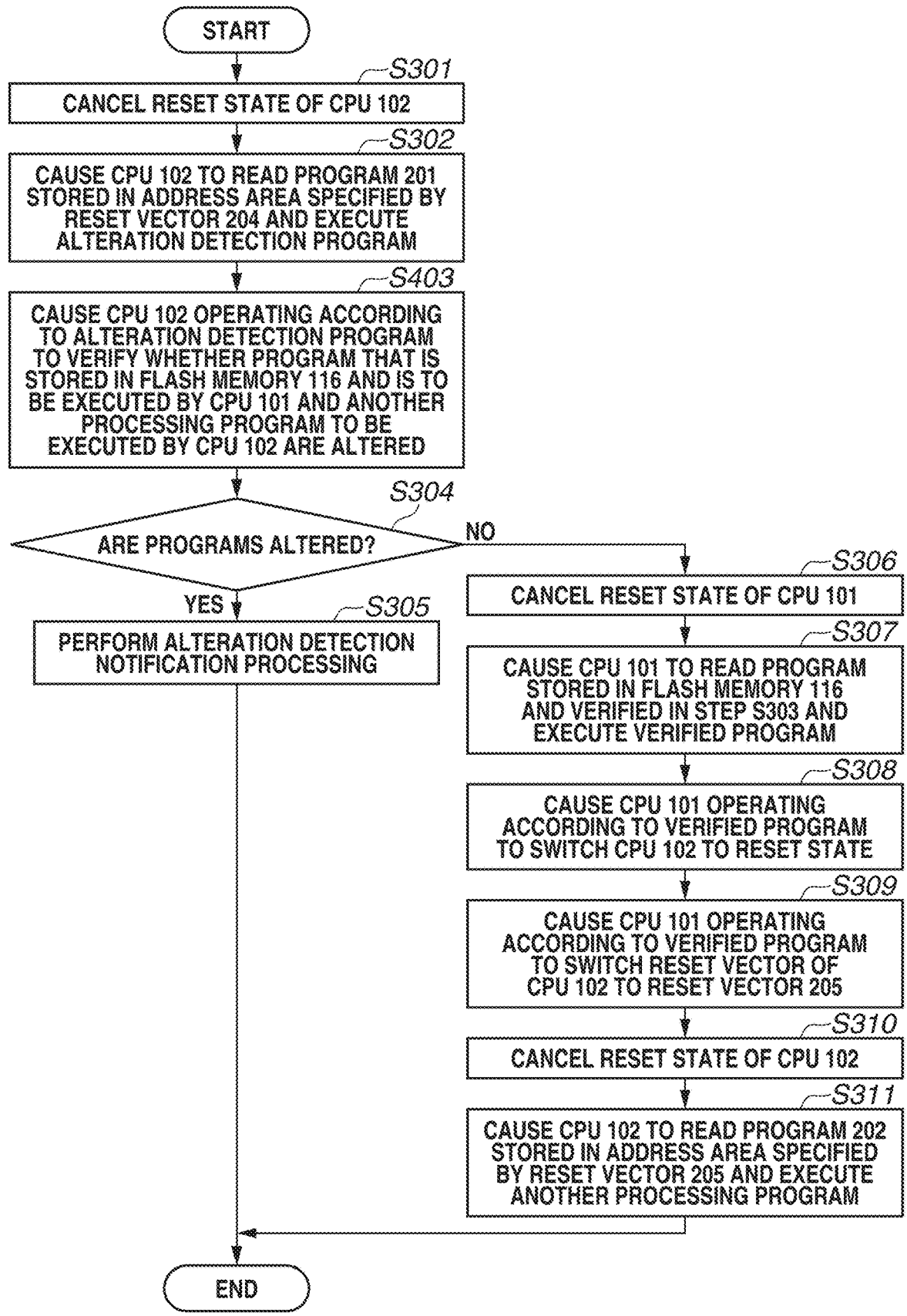

INFORMATION PROCESSING APPARATUS AND METHOD OF CONTROLLING INFORMATION PROCESSING APPARATUS

BACKGROUND

Field

The present disclosure relates to an information processing apparatus and a method of controlling the information processing apparatus.

Description of the Related Art

There is known a method for detecting an alteration in an activation program that is to be executed by a central processing unit (CPU) of an information processing apparatus (e.g., WO 2009-013825).

For example, WO 2009-013825 discusses a method in which a CPU different from a CPU that is to execute an activation program verifies whether the activation program is altered, because the CPU that is to execute the activation program cannot detect an alteration in the activation program.

In response to social demands for more advanced performance, an information processing apparatus today generally includes a plurality of CPUs to execute a plurality of types of processing simultaneously and smoothly, and each CPU executes a different processing program from those executed by the other CPUs.

Thus, in a case in which an information processing apparatus includes a function of verifying whether an activation program is altered, one of a plurality of CPUs of the information processing apparatus is to be caused to execute an alteration verification program on the activation program besides a processing program that the CPU originally executes.

In this case, an operation program is controlled in such a manner that the CPU that is to execute the alteration verification program first executes the alteration verification program and, after the verification is completed, the CPU is switched to execute the processing program.

SUMMARY

However, it has now been determined that there are issues with the conventional technology discussed immediately above, for example, in that if the operation program is altered, the CPU may be switched to a program that is not the target processing program.

In consideration of the above-discussed issues, according to an aspect of the present disclosure, an information processing apparatus includes a first memory, a first processing unit, a second memory storing an alteration detection program, and a second processing unit that executes the alteration detection program to implement an alteration detection unit configured to perform alteration detection on a program that is to be executed at a time of activation of the first processing unit and that is stored in the first memory, an activation unit configured to activate the first processing unit using the program that is to be executed at the time of activation, in a case where the alteration detection unit detects no alteration in the program that is to be executed at the time of activation, and a control unit configured to control the first processing unit, in the case where the alteration detection unit detects no alteration in the program to be executed at the time of activation, by signalling the first processing unit to switch a program that is to be executed by the second processing unit from the alteration detection program stored in the second memory to another processing program stored in the first memory.

Further features of the present disclosure will become apparent from the following description of exemplary embodiments with reference to the attached drawings.

BRIEF DESCRIPTION OF THE DRAWINGS

FIG. 4 is a flowchart illustrating a control process for switching an operation program of a CPU according to a second exemplary embodiment.

DESCRIPTION OF THE EMBODIMENTS

Various exemplary embodiments of the present disclosure will be described in detail below with reference to the attached drawings. It should be noted that the below-described exemplary embodiments are not intended to limit the scope of the claims. While a multi-function peripheral (MFP) (digital MFP/MFP/multi-function peripheral) will be described below as an example of an information processing apparatus according to an exemplary embodiment of the present disclosure, applications are not limited to the MFP, and any information processing apparatus can be employed.

<Information Processing Apparatus (MFP) 100>

Figure 1:
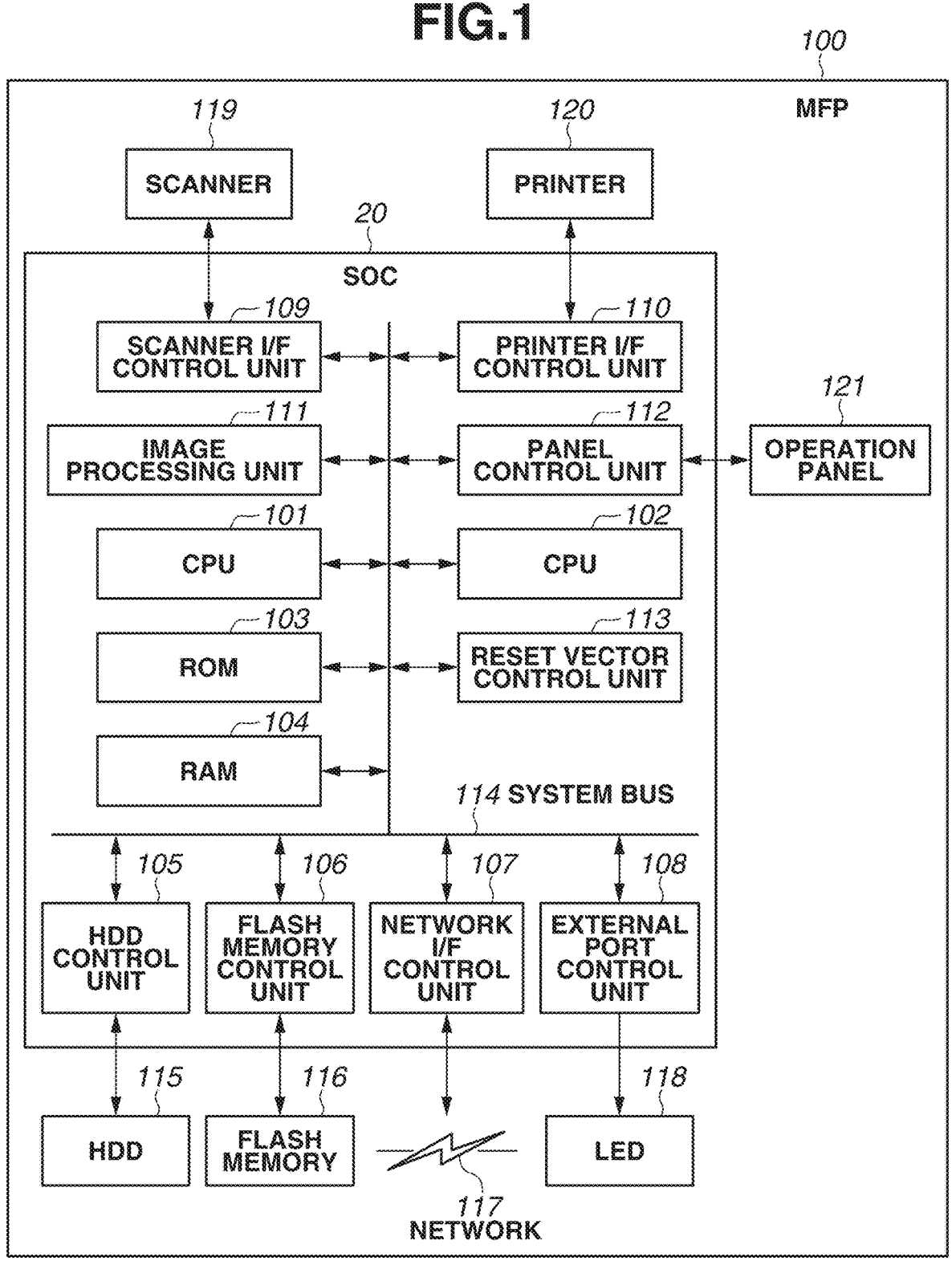
FIG. 1 is a block diagram illustrating a multi-function peripheral (MFP) according to an exemplary embodiment of the present disclosure.

FIG. 1 is a block diagram illustrating a MFP 100 according to a first exemplary embodiment. A system-on-chip (SOC) 20 includes modules 101 to 114 configured to control the MFP 100 as described below.

A central processing unit (CPU) 101 is a processor that executes various software programs of the MFP 100 and performs various types of control of the MFP 100. A CPU 102 is a processor that executes an alteration detection software program and another application program that is different from the programs that are executed by the CPU 101, and performs alteration detection on the MFP 100 and controls some of applications.

A read-only memory (ROM) 103 stores a fixed parameter of the MFP 100. Further, the ROM 103 stores the alteration detection software program and a public key described below. The ROM 103 is a mask ROM including a logic circuit so as not to permit writing from an external interface (IN) or a one-time programmable (OTP) ROM that permits writing only once at the time of manufacture.

A random access memory (RAM) 104 (volatile storage medium) is used to store a program and temporary data when the CPUs 101 and 102 control the MFP 100. A hard disk drive (HDD) control unit 105 performs control to read and write data from and to an HDD 115 (non-volatile storage medium). For example, the HDD control unit 105 can write image data stored in the RAM 104 to the HDD 115 via a system bus 114 and stores the image data in the HDD 115.

A flash memory control unit 106 performs control to read and write data from and to a flash memory 116. At the time of activation, the flash memory control unit 106 can read a program stored in the flash memory 116 and develops the read program to the RAM 104 via the system bus 114.

A network PT control unit 107 controls data transmission and reception to and from another device and a server on a network 117. An external port control unit 108 is an input/output port control unit of the SOC 20. For example, the external port control unit 108 optionally may control an output port so that a light-emitting diode (LED) 118 is turned on to externally provide a notification of an abnormality in the software and hardware.

A scanner I/F control unit 109 controls document reading performed by a scanner 119. A printer I/F control unit 110 controls printing processing performed by a printer 120.

An image processing unit 111 is a processing unit that performs shading correction on image data read from the scanner 119 and performs halftone processing and smoothing processing to output processed data to output to the printer 120.

A panel control unit 112 controls an operation panel 121, which is a touch panel, and controls a display of various types of information and input of a user instruction. A reset vector control unit 113 is a control unit that changes a setting of a reset vector (address value that is referred to after a reset state is cancelled in order to read a program to be executed after a power source is turned on) of the CPU 102, and includes a resister. The CPU 101 sets a resister setting of the reset vector control unit 113.

The system bus 114 connects the connected modules to one another. Control signals from the CPUs 101 and 102 and data signals between the devices are transmitted and received via the system bus 114.

The HDD 115 is a hard disk drive to store some of applications and various types of data. The flash memory 116 stores a basic input/output system (BIOS), a bootloader, a kernel, and an application. The HDD 115 and the flash memory 116 can be the same storage module.

<Mechanism by which Program is Switched to Altered Program>

A mechanism by which a program to be executed by a CPU is switched to an altered program, which is an issue to be solved by the present exemplary embodiment, will be described below.

Figure 2:
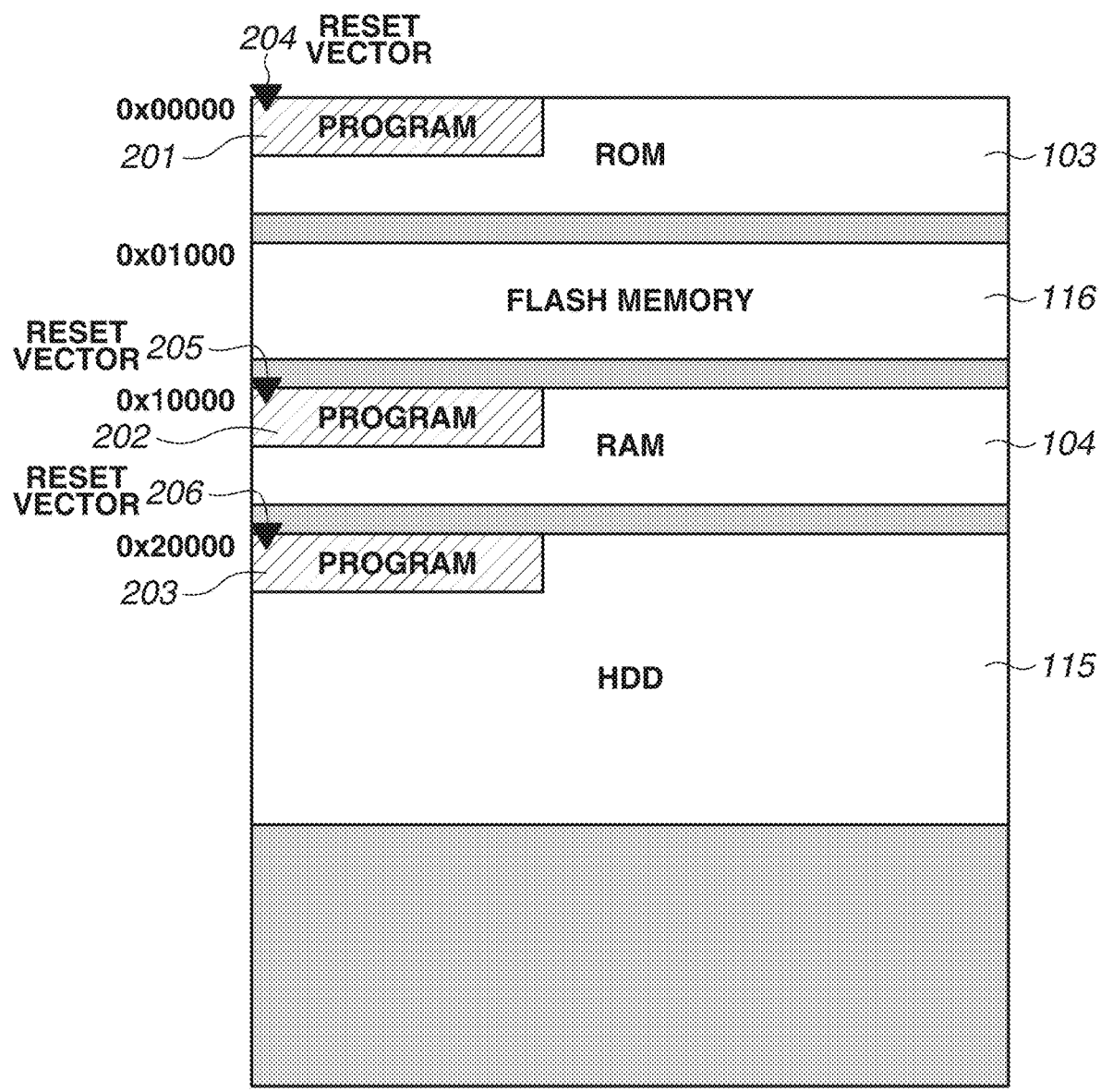
FIG. 2 illustrates an example of a memory address map as viewed from a central processing unit (CPU) according to an exemplary embodiment of the present disclosure.

FIG. 2 illustrates an example of a memory address map (logic address map) of the storage units as viewed from the CPU 102.

On the memory address map illustrated in FIG. 2, an address area of the ROM 103 is assigned from an address 0x00000, and an address area of the flash memory 116 is assigned from an address 0x01000. Further, an address area of the RAM 104 is assigned from an address 0x10000, and an address area of the HDD 115 is assigned from an address 0x20000.

In the present exemplary embodiment, a case of switching an operation program in such a manner that the CPU 102 first executes an alteration verification program and then executes another processing program after the verification is completed will be described below as an example.

In FIG. 2, programs 201 to 203 are to be executed by the CPU 102, and reset vectors 204 to 206 are reference destinations (address values) where the programs 201 to 203 are stored and to which the CPU 102 first refers after activation.

The program 201 is the alteration verification program that the CPU 102 first executes. The program 201 is stored from the address value 0x00000 specified by the reset vector 204 of the address area of the ROM 103.

The program 202 is the other processing program that the CPU 102 executes after the verification is completed. The program 202 is stored from the address value 0x01000 specified by the reset vector 205 of the address area of the flash memory 116.

The other processing program to be executed by the CPU 102 is, for example, a processing program for performing sleep control (control to change to a normal state/sleep state) on the CPU 101 to reduce power consumption of the MFP 100 or an image processing program. In a case in which the CPU 101 satisfies a condition for changing to the sleep state, the other processing program is executed.

The program 203 is an altered processing program that is stored in advance by an altering person (who wants to alter a program) so that the CPU 102 executes the program 203 after the verification is completed. The program 203 is stored from the address value 0x02000 specified by the reset vector 206 of the address area of the HDD 115.

Specifically, the reset vector of the CPU 102 is supposed to be set first to the reset vector 204, where the alteration verification program (program 201) is stored, and then to the reset vector 205, where the other processing program (program 202) is stored, after the verification is completed.

However, since the reset vector setting of the CPU 102 is set by changing a resister value of the reset vector control unit 113 by the operation program of the CPU 101, if the operation program of the CPU 101 is altered, the reset vector setting may be changed by the altering person.

In the example illustrated in FIG. 2, if the reset vector setting is changed to the reset vector 206 where the program 203, which is the altered processing program, is stored, the operation program of the CPU 102 is changed to the program 203, which is the altered processing program.

Further, the reset vector may be switched to an address of an unaltered processing program stored in the HDD 115 or the RAM 104 other than the altered program 203.

<Sequence of Switching Operation Program of CPU 102>

The control to switch a program to be operated by the CPU 102, which is a feature of the present exemplary embodiment, will be described below.

Figure 3:
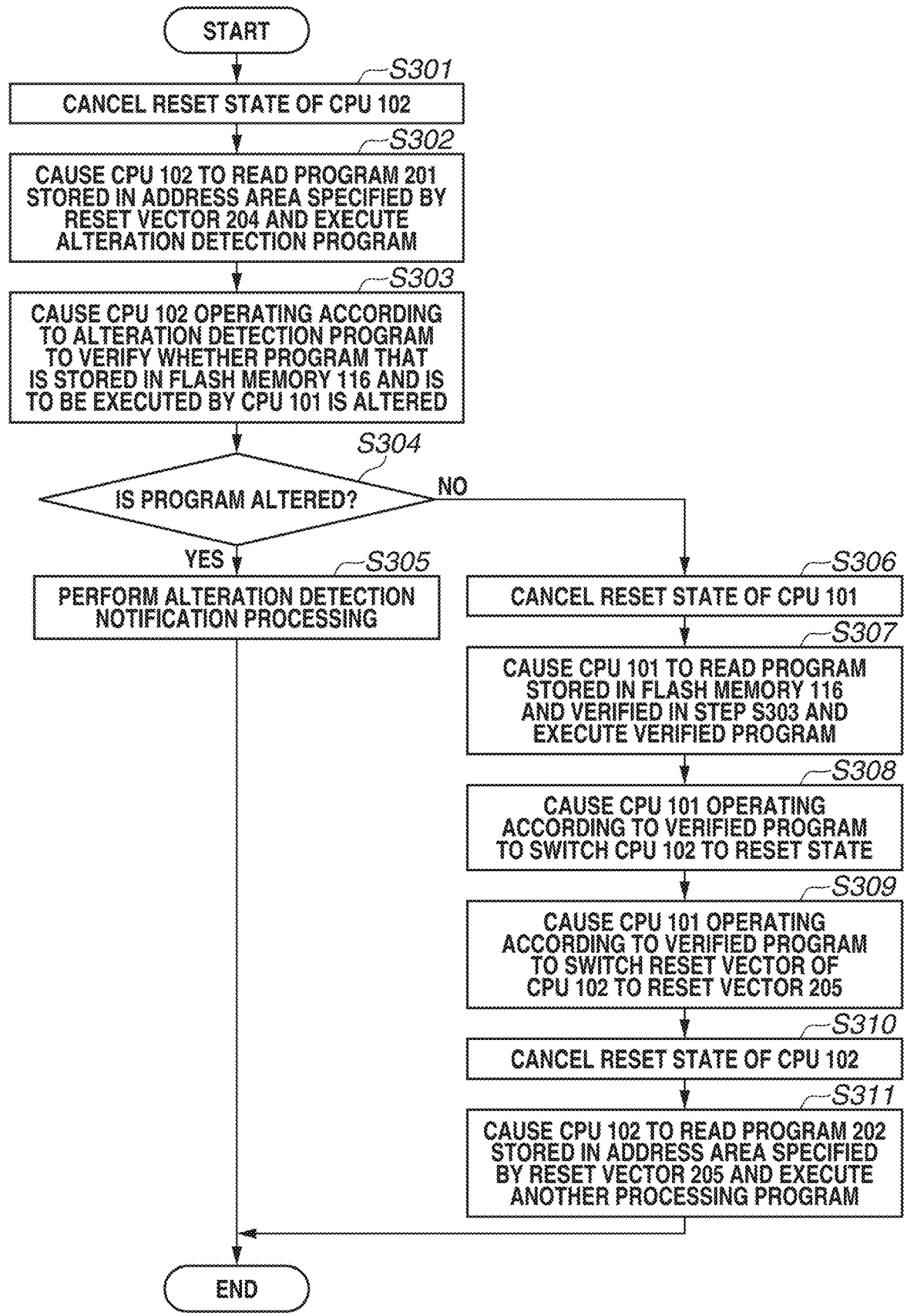
FIG. 3 is a flowchart illustrating a control process for switching an operation program of a CPU according to a first exemplary embodiment.

FIG. 3 is a flowchart illustrating a program to be operated by the CPU 102 immediately after the MFP 100 is turned on and a program switching sequence according to the first exemplary embodiment.

When the MFP 100 is turned on, each module in the MFP 100 is reset, and then in step S301, only the reset state of the CPU 102 is cancelled so that the CPU 102 is activated. The control to reset the modules in the MFP 100 is performed by, for example, switching a logic of a reset signal to be supplied to the modules at a desired timing using a reset control integrated circuit (IC).

After the reset state of the CPU 102 is cancelled, the CPU 102 is activated so as to read the program stored in the address area specified by the reset vectors 204 to 206 and execute the read program.

In an initial state after the resetting, the reset vectors 204 to 206 of the CPU 102 are set to the reset vector 204, which specifies the address area of the ROM 103. Accordingly, in step S302, the CPU 102 is activated in a state where the CPU 102 reads the program 201, which is the alteration detection program and is stored in the ROM 103 that is the address area specified by the reset vector 204, and operates according to the program 201.

In step S303, the CPU 102 operating based on the alteration detection program verifies whether the program stored in the flash memory 116 is altered. The program on which the alteration verification is performed in step S303 is a program to be executed at the time of activation of the CPU 101. Iii step S303, the program stored in the flash memory 116 is read to the RAM 104, and whether the read program is altered is verified. In step S303, the program 202 stored in the flash memory 116 can be read to the RAM 104.

In the present exemplary embodiment, a case in which whether there is an alteration is verified (hereinafter, "alteration verification") using a digital signature (hereinafter, "signature") to which a commonly-used public key cryptography method is applied will be described below as an example. Obviously, an alteration verification program using something other than the digital signature can also be employed.

Signature data is a hash value calculated using a hash function with respect to a portion of a program or the entire program to be executed by the CPU 101, and the signature data is stored in advance together with a public key, which is one of a pair of encryption keys, in the ROM 103 at the timing of product shipment.

Meanwhile, the program to be executed by the CPU 101 is stored together with the signature data in the flash memory 116, which is rewritable by a ROM writer, because the program may be rewritten later by software update. There is a possibility that the signature data stored in the flash memory 116 is externally accessed, so that the signature data is encrypted using a private key, which is the other one of the pair of encryption keys.

The CPU 102 operating based on the program 201, which is the alteration detection program, first reads the encrypted signature data stored in the flash memory 116 and stores the read signature data in the RAM 104. Next, the CPU 102 decodes the encrypted signature data using the public key stored in the ROM 103. Then, the CPU 102 compares the decoded signature data and the signature data stored in advance in the ROM 103 to verify whether the signature data is altered.

In step S304, the CPU 102 compares the decoded signature data and the stored signature data, and in a case where there is even a small difference, the CPU 102 determines that "the program is altered", whereas in a case where the decoded signature data and the stored signature data match, the CPU 102 determines that "the program is not altered".

In a case where the CPU 102 determines that "the program is altered" in step S304 (YES in step S304), then in step S305, the CPU 102 performs alteration detection notification processing. The MFP 100 according to the present exemplary embodiment controls the output port to be supplied to the LED 118 via the external port control unit 108 to turn on the LED 118 as an external notification of the presence of the alteration.

On the other hand, in a case where the CPU 102 determines that "the program is not altered" in step S304 (NO in step S304), then in step S306, the reset state of the CPU 101 is cancelled. The reset state of the CPU 101 is cancelled by switching the logic of the reset signal to be supplied to the CPU 101 to a value that indicates "cancel"

In step S307, after the reset state of the CPU 101 is cancelled, the CPU 101 reads the program stored in the address area specified by the reset vector of the flash memory 116 (as the reset vector of the CPU 101 remains unchanged) and develops the read program to the RAM 104. Then, the CPU 101 after the reset state is cancelled executes the program developed to the RAM 104 to perform processing to activate the CPU 101.

The reset vector setting of the CPU 102 is set by the program to be executed by the CPU 101, which is an alteration verification target. If the reset vector setting of the CPU 102 is altered, the signature data stored in the flash memory 116 becomes different from the signature data stored in the ROM 103, which is a correct value, so that the alteration of the reset vector is detected.

When the activation of the CPU 101 is completed, then in step S308, the CPU 101 resets the CPU 102 based on the read program having undergone the alteration verification. The CPU 102 is reset by switching the logic of the reset signal to be supplied to the CPU 101 to a value that indicates "reset".

Then, in step S309, the CPU 101 switches the reset vectors 204 to 206 of the CPU 102 to the reset vector 205 based on the program having undergone the alteration verification. In the program having undergone the alteration verification, a resister setting value of the reset vector control unit 113 that specifies the reset vector 205 is programmed as the reset vector of the CPU 102. Accordingly, the reset vector 205 is set to the CPU 102 by setting the resister value to the resister of the reset vector control unit 113.

Thereafter, in step S310, the CPU 101 switches the logic of the reset signal of the CPU 102 and cancels the reset state of the CPU 102 so that the CPU 102 is re-activated.

After the reset state of the CPU 102 is cancelled, the CPU 102 reads the program stored in the address area specified by the reset vector 205 and is activated so as to execute the read program. The RAM 104, which is the address area specified by the reset vector 205, stores the other processing program different from the alteration detection program to be executed by the CPU 102.

The other processing program to be executed by the CPU 102 is stored in the flash memory 116 at the time immediately after the MFP 100 is turned on.

Since an access speed of the flash memory 116 is slow, the other processing program to be executed by the CPU 102 is stored in advance in the RAM 104, which is faster in access speed, by the CPU 101 operating based on the program having undergone the alteration verification.

Accordingly, in step S311, the CPU 102 reads the program 202, which is the other processing program and is stored in the RAM 104, which is the address area specified by the reset vector 205, and the CPU 102 is activated in a state of operating based on the program 202, which is the other processing program.

As described above, the MFP 100 according to the first exemplary embodiment performs control in such a manner that at the time of switching the program to be operated by the CPU 102, the CPU 101 operating based on the program having undergone the alteration verification switches the reset vectors 204 to 206 of the CPU 102.

In other words, the CPU 102 reads the program stored in the address area specified by the reset vector having undergone the alteration verification, and is activated. This reduces the possibility that the reset vector setting is altered by an altering person and the CPU 102 is activated from the address area storing the altered program to execute the altered program.

In the first exemplary embodiment described above, the control is performed in such a manner that the CPU 101 operating based on the program having undergone the alteration verification switches the reset vector of the CPU 102 to switch the program to be operated by the CPU 102 to the other processing program.

However, in a case where the program 202, which is the other processing program, is stored in the flash memory 116, there is a possibility that the program 202 is altered, since the flash memory 116 is externally rewritable using a writing device.

Accordingly, even if the CPU 101 operating based on the program having undergone the alteration verification switches the reset vector of the CPU 102, there is still a possibility that the CPU 102 is activated based on an altered program.

In a second exemplary embodiment, the alteration verification is also performed on the other processing program (program 202), which is to be executed by the CPU 102 and is stored in the flash memory 116, in order to address the above-described issue. An MFP according to the second exemplary embodiment will be described below as an example. In the description of the MFP according to the second exemplary embodiment, a module or processing alike that of the MFP according to the first exemplary embodiment is given the same reference numeral, and description thereof is omitted.

<Sequence of Switching Operation Program of CPU 102>

FIG. 4 is a flowchart illustrating a program to be operated by the CPU 102 immediately after the MFP 100 is turned on and a program switching sequence according to the second exemplary embodiment.

In the flowchart illustrated in FIG. 4, steps S301 and S302 are alike those in the flowchart (in FIG. 3) according to the first exemplary embodiment, so that description thereof is omitted.

In step S403, when the CPU 102 is activated in a state of operating based on the alteration detection program, the CPU 102 verifies whether the program that is stored in the flash memory 116 and is to be operated by the CPU 101 and the other processing program that is to be executed by the CPU 102 are altered.

Signature data of the other processing program (program 202) to be operated by the CPU 102 is also stored in advance in the ROM 103 besides the signature data of the program to be operated by the CPU 101.

Meanwhile, encrypted signature data of the other processing program (program 202) to be operated by the CPU 102 is stored in advance in the flash memory 116 besides the encrypted signature data of the program to be operated by the CPU 101.

The CPU 102 operating based on the alteration detection program (program first decodes the encrypted signature data of the program to be operated by the CPU 101, which is stored in the flash memory 116. Then, the CPU 102 verifies whether the program to be operated by the CPU 101 is altered, by checking whether the decoded signature data matches the signature data of the program to be operated by the CPU 101, which is stored in the ROM 103.

The CPU 102 decodes the encrypted signature data of the other processing program (program 202) to be operated by the CPU 102, which is stored in the flash memory 116. Then, the CPU 102 verifies whether the other processing program (program 202) to be operated by the CPU 102 is altered, by checking whether the decoded signature data matches the signature data of the other processing program (program 202), which is stored in the ROM 103.

In the flowchart illustrated in FIG. 4, steps S304 to S311 are hose in the flowchart (in FIG. 3) according to the first exemplary embodiment, so that description thereof is omitted.

As described above, the MFP 100 according to the second exemplary embodiment performs control in such a manner that the CPU 102 operates based on the program 202, which is the other processing program having undergone the alteration verification.

Specifically, even if the reset vector of the CPU 102 is set to the reset vector 205, which is the same as that in the first exemplary embodiment, the alteration verification can be performed on the program 202 at the time of switching the program to be executed by the CPU 102 to the other processing program (program 202).

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214684, filed Nov. 15, 2018, which is hereby incorporated by reference herein in its entirety.

What is claimed is:

1. An information processing apparatus comprising:
   a first processor;
   a first memory storing a processing program that is executed by the first processor in activating the information processing apparatus and a power control program for performing power saving control;
   a second processor; and
   a second memory storing an alteration detection program that is executed by the second processor,
   wherein, based on activation of the information processing apparatus, the second processor executes the alteration detection program to verify whether the processing program is altered,
   wherein the first processor executes the processing program in response to the second processor verifying that the processing program has not been altered, wherein the first processor changes an operation program that is executed by the second processor from the alteration detection program to the power control program by switching a reset vector from an address area of the second memory to an address area of the first memory in response to the processing program being executed, the reset vector being an address value that is referred to after a reset state of the second processor is canceled, and wherein, when a shift condition for shifting of the information processing apparatus into a power saving state is satisfied, the second processor causes the first processor to shift into a power saving state by executing the power control program.

2. The information processing apparatus according to claim 1, wherein the second processor detects whether or not the processing program is altered, wherein the second processor activates the first processor in a case where the processing program is not altered, and wherein the second processor does not activate the first processor in a case where the processing program is altered.

3. The information processing apparatus according to claim 1, wherein, based on the processing program, the first processor switches the operation program that is executed by the second processor from the alteration detection program to the power control program, and re-activates the second processor.

4. The information processing apparatus according to claim 1, wherein the alteration detection program, when executed, performs alteration detection on the power control program stored in the first memory.

5. The information processing apparatus according to claim 1, wherein the first memory is a volatile storage memory.

6. The information processing apparatus according to claim 1, wherein the second memory is a non-volatile storage medium.

7. A method of processing information in an information processing apparatus, the information processing apparatus having a first processor, a first memory storing a processing program that is executed by the first processor in activating the information processing apparatus and a power control program for performing power saving control, a second processor, and a second memory storing an alteration detection program that is executed by the second processor, the method comprising:

executing, based on activation of the information processing apparatus, the alteration detection program by the second processor to verify whether the processing program is altered, executing, by the first processor, the processing program in response to the second processor verifying that the processing program has not been altered and, changing, by the first processor, an operation program that is executed by the second processor from the alteration detection program to the power control program by switching a reset vector from an address area of the second memory to an address area of the first memory in response to the processing program being executed, the reset vector being an address value that is referred to after a reset state of the second processor is canceled, and causing the first processor to shift into a power saving state by executing the power control program by the second processor when a shift condition for shifting of the information processing apparatus into a power saving state is satisfied.

8. The information processing apparatus according to claim 1, wherein the first memory stores an image processing program, and wherein, by executing the processing program, the first processor enables the second processor to execute the image processing program.

9. The information processing apparatus according to claim 1, further comprising a third memory storing the processing program, wherein the processing program is read from the third memory and stored in the first memory.

* * * * *